United States Patent
Sato

(10) Patent No.: US 7,111,646 B2
(45) Date of Patent: Sep. 26, 2006

(54) MULTILAYER RESIN PIPE

(75) Inventor: Masatomi Sato, Koga (JP)

(73) Assignee: Sanoh Kogyo Kabushiki Kaisha, Koga (JP)

( * ) Notice: Subject to any disclaimer, the term of this patent is extended or adjusted under 35 U.S.C. 154(b) by 0 days.

(21) Appl. No.: 11/247,547

(22) Filed: Oct. 11, 2005

(65) Prior Publication Data

US 2006/0086402 A1   Apr. 27, 2006

(30) Foreign Application Priority Data

Oct. 25, 2004   (JP) .............................. 2004-309725

(51) Int. Cl.
   *F16L 11/00*   (2006.01)
(52) U.S. Cl. ...................... 138/137; 138/140; 138/141; 428/36.4; 428/36.91
(58) Field of Classification Search ................ 138/137, 138/140, 141; 428/36.9, 36.91, 36.4
   See application file for complete search history.

(56) References Cited

U.S. PATENT DOCUMENTS

| | | | |
|---|---|---|---|
| 5,937,911 A * | 8/1999 | Kodama et al. ............ 138/137 |
| 6,090,459 A | 7/2000 | Jadamus et al. | |
| 6,446,673 B1 * | 9/2002 | Iio et al. ...................... 138/137 |
| 2005/0003126 A1 * | 1/2005 | Ito et al. ................... 428/36.9 |
| 2005/0011572 A1 * | 1/2005 | Belcher ...................... 138/137 |
| 2005/0131147 A1 | 6/2005 | Brule | |

FOREIGN PATENT DOCUMENTS

| EP | 1 449 885 | 8/2004 |
|---|---|---|
| WO | 03/007314 | 1/2003 |

\* cited by examiner

*Primary Examiner*—Patrick Brinson
(74) *Attorney, Agent, or Firm*—Ladas and Parry LLP

(57) ABSTRACT

A multilayer resin pipe includes a plurality of resin layers. At least the innermost resin layer is made of a resin having a low permeability. At least one of the resin layers of the multilayer resin pipe is an electrically conductive layer having electrical conductivity and containing electrically conductive filamentous filler.

10 Claims, 2 Drawing Sheets

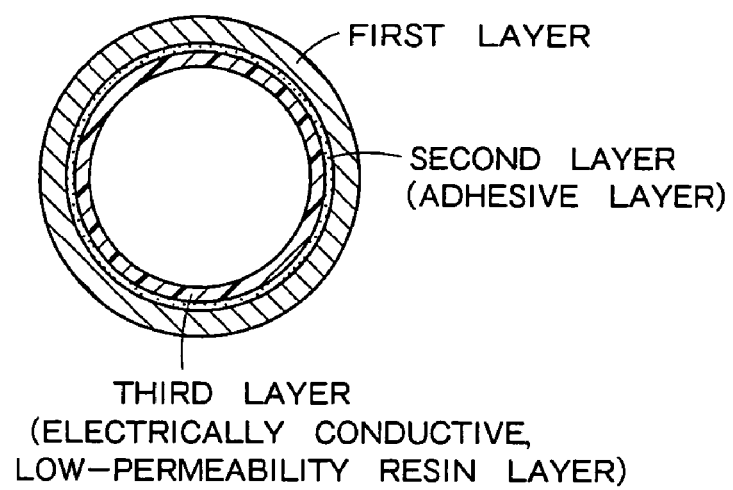
F I G. 1
F I G. 2
F I G. 3

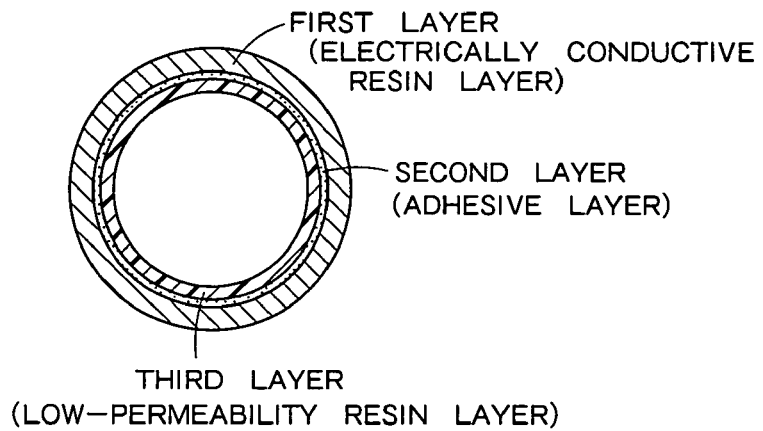
F I G. 4
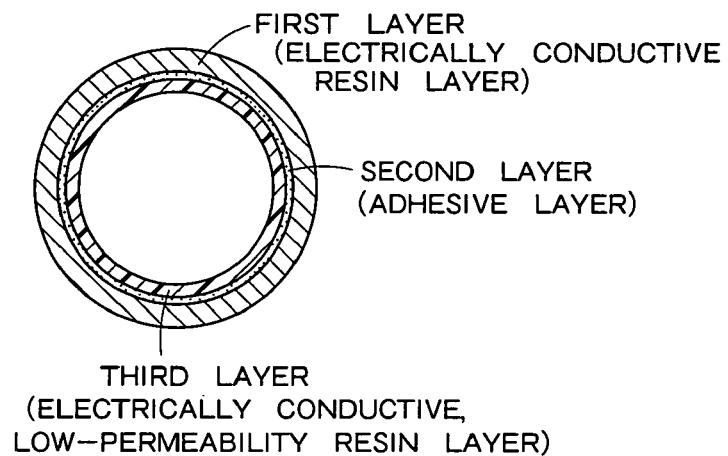
F I G. 5
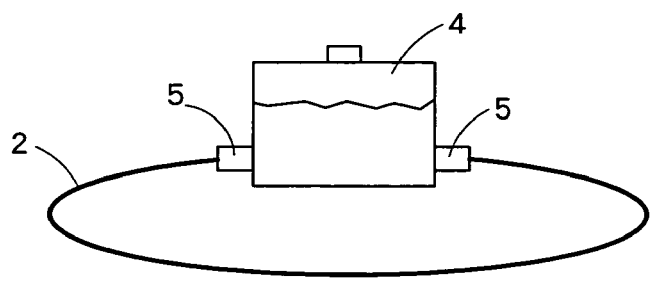
F I G. 6

MULTILAYER RESIN PIPE

BACKGROUND OF THE INVENTION

1. Field of the Invention

The present invention relates to a multilayer resin pipe for an automotive fuel line and, more particularly, to a multilayer resin pipe provided with a conductive resin layer containing carbon nanotubes.

2. Description of the Related Art

Metal pipes have been generally used as fuel pipes on automobiles. Metal pipes are plated or coated with a resin film to enhance the corrosion resistance and chemical resistance thereof.

Recently, resin pipes have been used as well as metal pipes for fuel lines. Resin pipes have many advantages over metal pipes. Resin pipes are not rusted, can be easily processed, are lightweight and increase the degree of freedom of design.

When a fuel pump pumps the fuel from a fuel tank into an automotive fuel line and when the fuel flows through the automotive fuel line, static electricity is generated due to friction between the fuel and the fuel pump and between the fuel and a fuel pipe forming the automotive fuel line and the fuel pipe is charged. The charged fuel pipe produces spark discharges. The spark discharges damage the coating film of the fuel pipe to deteriorate the corrosion resistance and abrasion resistance of the fuel pipe. Therefore, the fuel pipe needs to be connected to a grounded on the automotive body to discharge static electricity from the fuel pipe.

Since the resin pipe is intrinsically dielectric, static electricity tends to accumulate on the resin pipe and the accumulated static electricity is liable to cause troubles. Recently developed electrically conductive pipes are made of a material containing an electrically conductive filler, such as carbon black or carbon fibers. The conductivity of a conventional electrically conductive resin pipe made of a material containing an electrically conductive filler decreases with time and cannot maintain sufficient conductivity.

Recently, a resin pipe to be used as a fuel pipe is required to have a low permeability, namely, a permeation resisting ability, additionally to make difficult the permeation of the fuel through the resin pipe. The low permeability is important to prevent the permeation of the fuel through the fuel pipe and the emission of the fuel into the atmosphere from the viewpoint of environmental protection.

The term "low-permeability resin" is used to indicate resins meeting a quality determined by the following permeability test methods. A CARB DBL method which is carried out by a SHED testing machine is a representative permeability test method of testing resins for fuel pipes.

Referring to FIG. 6, a resin pipe 2 having an inside diameter of 6 mm, an outside diameter of 8 mm and a length of 5 m or above is tested. The opposite ends of the resin pipe 2 are connected by sealing joints 5 to a sealed container 4 made of a stainless steel. The resin pipe 2 filled up with test fuel is held at 40° C. for fifty days or longer for pretreatment. Then, the pretreated resin pipe 2 is connected to a SHED testing machine, not shown. The SHED testing machine measures the quantity of hydrocarbons permeated the resin pipe 2 and contained in the test fuel contained in the resin pipe 2. When the measured quantity of hydrocarbons is 50 mg/m·day or below, the resin forming the resin pipe 2 is called a low-permeability resin.

A conventional multilayer resin pipe designed to meet required a low permeability has an inner layer to be exposed to fuel made of a resin having a low permeability and an outer layer of a polyamide resin or the like covering the inner layer and bonded to the inner layer with an adhesive layer. This conventional multilayer resin pipe, however, does not have both electrical conductivity and low permeability.

SUMMARY OF THE INVENTION

Accordingly, it is an object of the present invention to provide a multilayer resin pipe of multilayer construction including a plurality of resin layers made of thermoplastic resins, wherein at least the innermost layer is a low-permeability resin layer, and at least one of the resin layers is an electrically conductive resin layer made of a resin containing electrically conductive filamentous filler.

In the multilayer resin pipe according to the present invention, it is preferable that the filler is carbon nanotubes or carbon filaments having lengths not shorter than a lower limit length determined on the basis of an expected elongation percentage and an expected working length of the multilayer resin pipe.

In the multilayer resin pipe according to the present invention, it is preferable that the resin forming the electrically conductive resin layer is a polyphenylene sulfide resin (PPS), an ethylene-tetrafluoroethylene copolymer(ETFE), polyamide 11 (PA 11) or polyamide 12 (PA 12).

The filamentous filler of the electrically conductive resin layer is not broken and the electrically conductive resin layer maintains its electrical conductivity even if the matrix of the electrically conductive resin layer swells. Consequently, the multilayer resin pipe is able to maintain both low permeability and electrical conductivity.

BRIEF DESCRIPTION OF THE DRAWINGS

FIG. 1 is a cross-sectional view of a multilayer resin pipe in a first embodiment according to the present invention;

FIG. 2 is a view showing carbon nanotubes dispersed in a matrix;

FIG. 3 is a view showing carbon filaments dispersed in a matrix;

FIG. 4 is a cross-sectional view of a multilayer resin pipe in a second embodiment according to the present invention;

FIG. 5 is a cross-sectional view of a multilayer resin pipe in a third embodiment according to the present invention; and FIG. 6 is a diagrammatic view of assistance in explaining a method of testing the permeation-resisting ability of resin pipes.

DESCRIPTION OF THE PREFERRED EMBODIMENTS

Multilayer resin pipes in preferred embodiments according to the present invention will be described with reference to the accompanying drawings.

First Embodiment

Referring to FIG. 1 showing a resin pipe in a first embodiment according to the present invention in a cross-sectional view, the resin pipe is a three-layer resin pipe having three resin layers. The three layers are a first layer, namely, an outer layer, a second layer, namely, a middle layer, and a third layer, namely, an inner layer. The third layer, namely, the inner layer, to be exposed to fuel is made of a thermoplastic resin having a low-permeability and containing a filamentous, electrically conductive filler. Thus the third layer has both a low permeability and an electrical conductivity. The first layer is made does not have a particularly low permeability like that of the third layer. The filamentous, electrically conductive filler contained in the thermoplastic resin forming the third layer is carbon nanotubes or carbon filaments.

Table 1 shows possible combinations of resins for forming the first and the third layer of the multilayer resin pipe in the first embodiment.

The first layer, namely, the outer layer, is made of a polyamide resin, such as PA 11, PA 12 or PA 6. Preferably, the third layer, namely, the low-permeability layer, is made of a PPS or a ETFE. Preferably, the filler content, namely, the carbon nanotube content or the carbon filament content, of the material forming the third layer is 5 to 30% by weight. When the filler content is 5% or below, the multilayer resin pipe cannot have a surface resistivity of $10^5$ Ω/m or below. If the filler content is 30% by weight or above, the tensile strength and impact strength of the third layer are excessively low.

If low permeability is not an important requirement of the third layer, the resin for the third layer may be PA 11 of a combination 5 or PA 12 of a combination 6 shown in Table 1.

When the low-permeability resin contains carbon nanotubes, the carbon nanotubes dispersed in the low-permeability resin are entangled as shown in FIG. 2. When the low-permeability resin contains carbon filaments, the carbon filaments dispersed in the low-permeability resin are entangled as shown in FIG. 3.

Since the third layer contains the electrically conductive filler, such as carbon nanotubes or carbon filaments, the multilayer resin pipe in the first embodiment exercises the following effects when used as an automotive fuel pipe.

When the multilayer resin pipe is used as an automotive fuel pipe, the third layer defining a fuel passage is exposed continuously to the fuel. Then, a hydrogen bonding reaction between the resin forming the third layer and the hydroxyl groups of the fuel occurs. As the hydrogen bonding reaction proceeds with time, the third layer swells. If the third layer contains carbon black or carbon fibers like the inner layer of the conventional multilayer resin pipe, gaps between the particles of carbon black or between the carbon fibers expand and reduce the electrical conductivity of the third layer.

The carbon nanotubes contained in the third layer as shown in FIG. 2 or the carbon filaments contained in the third layer as shown in FIG. 3 remain entangled even if the resin as a matrix swells. Consequently, the third layer is able to maintain its electrical conductivity. Since the third layer is made of a resin having a low permeability to the fuel, the third layer maintains its low permeability to the fuel even if the third layer is caused to swell. Thus the third layer maintains its original electrical conductivity and low permeability.

The length of the carbon nanotubes or the carbon filaments affects significantly the maintenance of the electrical conductivity of the third layer. The resin pipe is used in a working environment in which the resin pipe is exposed continuously to heat. The minimum length of the carbon nanotubes or the carbon filaments necessary to maintain the electrical conductivity is dependent on dimensional change, such as elongation. For example, the length of the resin pipe used in an automotive fuel line is 1000 mm at the longest. Suppose that the elongation percentage of the resin pipe of 1000 mm is 0.3%. Then, the elongation of the resin pipe is 3 mm at a maximum and hence it is possible that the carbon nanotubes or carbon filaments dispersed in the resin are separated from each other when the resin pipe elongates unless the length of the carbon nanotubes or the carbon filaments is 3 mm or above. Thus the necessary minimum length of the carbon nanotubes or the carbon filaments is determined on the basis of an expected working length of the resin pipe and an expected elongation percentage of the resin pipe.

Second Embodiment

A multilayer resin pipe in a second embodiment according to the present invention has a third layer, namely, an inner layer to be exposed to fuel, made of a low-permeability resin similarly to the third layer of the multilayer resin pipe in the first embodiment. The multilayer resin pipe in the second embodiment differs from the multilayer resin pipe in the first embodiment in that a first layer, namely, an outer layer, of the former is an electrically conductive resin layer made of a resin containing an electrically conductive, filamentous filler.

Thus the first and the third layer of the multilayer resin pipe in the second embodiment are an electrically conductive resin layer and a low-permeability resin layer, respectively; that is, electrical conductivity and permeation resistance are assigned separately to the first and the third layer, respectively. Since the carbon nanotubes or the carbon filaments dispersed in the resin forming the first layer reinforce the first layer and give electrical conductivity to the first layer, the first layer enhances the impact strength of the multilayer resin pipe.

Table 2 shows possible combinations of resins for forming the first and the third layer of the multilayer resin pipe in the second embodiment.

The first layer, namely, the outer layer, is made of a polyamide resin, such as PA 11, PA 12 or PA 6. Preferably, the carbon naontube content or the carbon filament content of the material forming the first layer is 5 to 30% by weight. Preferably, the third layer, namely, the low-permeability layer, is made of a PPS or a ETFE.

Third Embodiment

Referring to FIG. 5 showing a multilayer resin pipe in a third embodiment according to the present invention in a cross-sectional view, the multilayer resin pipe in the third embodiment is a selective combination of the respective construction styles of the multilayer resin pipe in the first embodiment and the multilayer resin pipe in the second embodiment. The multilayer resin pipe in the third embodiment has a first layer, namely, an outer layer and a third layer, namely, an inner layer to be exposed to fuel. The third layer is made of a low-permeability resin. Both the first and the third layer are electrically conductive layers respectively made of resins containing an electrically conductive filamentous filler.

The multilayer resin pipe in the third embodiment, similarly to the multilayer resin pipe in the first embodiment, has an enhanced electrical conductivity. The electrically conductive filamentous filler, namely, carbon nanotubes or carbon filaments, enhances the strength of the multilayer resin pipe.

Table 3 shows possible combinations of resins for forming the first and the third layer of the multilayer resin pipe in the third embodiment.

TABLE 1

|  | 1 | 2 | 3 | 4 | 5 | 6 |
|---|---|---|---|---|---|---|
| First layer | PA | PA | PA | PA | PA | PA |
| Third layer | PPS | ETFE | ETFE | PPS | PA | PA |

TABLE 1-continued

|  | 1 | 2 | 3 | 4 | 5 | 6 |
|---|---|---|---|---|---|---|
| Electrically conductive filler | CNT | Carbon filaments | CNT | Carbon filaments | CNT | Carbon filaments |

TABLE 2

|  | 1 | 2 | 3 | 4 | 5 | 6 |
|---|---|---|---|---|---|---|
| First layer | PA | PA | PA | PA | PA | PA |
| Electrically conductive filler | CNT | Carbon Filaments | CNT | Carbon Filaments | CNT | Carbon filaments |
| Third layer | PPS | ETFE | ETFE | PPS | PA | PA |

TABLE 3

|  | 1 | 2 | 3 | 4 | 5 | 6 |
|---|---|---|---|---|---|---|
| First layer | PA | PA | PA | PA | PA | PA |
| Electrically conductive filler | CNT | Carbon Filaments | CNT | Carbon Filaments | CNT | Carbon filaments |
| Third layer | PPS | ETFE | ETFE | PPS | PA | PA |
| Electrically conductive filler | CNT | Carbon Filaments | CNT | Carbon Filaments | CNT | Carbon filaments |

What is claimed is:

1. A multilayer resin pipe of multilayer construction comprising a plurality of resin layers made of thermoplastic resins,
   wherein at least the innermost layer is a low-permeability resin layer, and at least one of the resin layers is an electrically conductive resin layer made of a resin matrix containing electrically conductive filamentous filler;
   wherein elements of the electrically conductive filamentous filler have lengths not shorter than a minimum length determined on the basis of an expected elongation percentage and an expected working length of the multilayer resin pipe, and
   wherein the elements of the electrically conductive filler have lengths greater than the product of the expected elongation percentage and the expected working length so that the filamentous filler of the electrically conductive resin layer is not broken and the electrically conductive resin layer maintains its electrical conductivity in the event the matrix of the electrically conductive resin layer swells.

2. The multilayer resin pipe according to claim 1, wherein the low-permeability resin layer serves also as an electrically conductive layer.

3. The multilayer resin pipe according to claim 1, wherein the electrically conductive resin layer is made of a polyphenylene sulfide resin, an ethylene-tetrafluoroethylene copolymer, Polyamide 11 or Polyamide 12.

4. The multilayer resin pipe according to claim 1, wherein the elements of the electrically conductive filler are carbon filaments.

5. The multilayer resin pipe according to claim 1, wherein the elements of the electrically conductive filler are carbon nanotubes.

6. The multilayer resin pipe according to claim 4 comprising a single layer containing the carbon filaments or a plurality of layers containing the carbon filaments.

7. The multilayer resin pipe according to claim 5 comprising a single layer containing the carbon nanotubes or a plurality of layers containing the carbon nanotubes.

8. The multilayer resin pipe according to claim 4, wherein the electrically conductive resin layer contains 5 to 30% by weight carbon filaments.

9. The multilayer resin pipe according to claim 5, wherein the electrically conductive resin layer contains 5 to 30% by weight carbon nanotubes.

10. The multilayer resin pipe according to claim 1 intended for use as an automotive fuel pipe.

* * * * *